US007149064B2

(12) United States Patent
Nolden et al.

(10) Patent No.: US 7,149,064 B2
(45) Date of Patent: Dec. 12, 2006

(54) MULTIPHASE REDUCED VOLTAGE STARTER WITH BYPASS RELAYS, INTERPHASE ELECTRICAL ISOLATION AND SHARED THERMAL MASS

(75) Inventors: Paul T. Nolden, Racine, WI (US); Steven R. McLaughlin, Glendale, WI (US); Matthew J. Alles, Kewaskum, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 661 days.

(21) Appl. No.: 10/652,294

(22) Filed: Aug. 29, 2003

(65) Prior Publication Data

US 2005/0047044 A1 Mar. 3, 2005

(51) Int. Cl.
*H02H 5/00* (2006.01)
(52) U.S. Cl. ........................................ 361/23; 361/103
(58) Field of Classification Search ................. 361/23, 361/103
See application file for complete search history.

(56) References Cited

U.S. PATENT DOCUMENTS 6,087,800 A    7/2000  Becker et al. .............. 318/778
6,184,965 B1 * 2/2001  Murayama et al. ......... 349/150
6,740,814 B1 * 5/2004  Ohta et al. ................. 174/68.1

OTHER PUBLICATIONS

"Soft Starter-Carefree switching!"; web page of Siemens AG obtained at www.ad.siemens.de/cd/sanftstarter/index_76.htm, printed Aug. 16, 2003.

\* cited by examiner

*Primary Examiner*—Stephen W. Jackson
(74) *Attorney, Agent, or Firm*—Keith M. Baxter; Alexander M. Gerasimow

(57) ABSTRACT

A power conversion system and methods of power conversion and construction of such a system are disclosed, where the system includes at least two pairs of input and output bus bars, and two pairs of switching devices, with the switching devices of each respective pair coupled in parallel in between a respective pair of the bus bars. When one of the switching devices of each pair is closed, the bus bars of the respective pair of bus bars are short-circuited to one another, thus bypassing the other of the switching devices of each pair. The other of the switching devices of each pair is attached to at least one intermediate portion, which in turn is attached to a mass. Substantially all the heat generated by the other of the switching devices of each pair is communicated to the mass, which has a heat capacity capable of receiving that heat.

66 Claims, 10 Drawing Sheets

US 7,149,064 B2

MULTIPHASE REDUCED VOLTAGE STARTER WITH BYPASS RELAYS, INTERPHASE ELECTRICAL ISOLATION AND SHARED THERMAL MASS

CROSS-REFERENCE TO RELATED APPLICATIONS

- - -

FIELD OF THE INVENTION

The present invention relates to power conversion systems. In particular, the present invention relates to AC-to-AC power converters such as reduced voltage starters.

BACKGROUND OF THE INVENTION

AC-to-AC power converters are commonly used in a variety of applications in which it is desirable for an input AC power (e.g., three-phase power provided via power lines) to be modified to a different, output AC power having different voltage, current or other characteristics. For example, AC-to-AC power converters can be used as motor controllers that govern the torque, speed, or other operations of the motors used in industrial or other applications.

AC drives are one type of AC-to-AC power converter that are frequently employed. AC drives typically employ one or more (e.g., in the case of three-phase input power, typically six) controlled switching devices such as Insulated Gate Bipolar Transistors (IGBTs), which are controlled to modify the characteristics of the input AC power to achieve the desired output AC power. By controlling the operation of the controlled switching devices through the use of a sophisticated controller, AC drives allow for a high degree of control over the power conversion process and the ultimate output AC power that is provided. In particular, AC drives typically allow for the modification of the voltage, current, frequency and phase of incoming power and thus are capable of providing outgoing power that has significantly different characteristics than the incoming power.

Despite the high degree of control afforded by AC drives, AC drives are somewhat disadvantageous in that the drives are complicated to control and consequently require the use of sophisticated controllers. Additionally, AC drives are somewhat disadvantageous in that the controlled switching devices (e.g., power semiconductor devices) continually generate significant amounts of heat while the AC drives are operating. Consequently, not only are AC drives somewhat inefficient in terms of the power conversion they provide, but also such drives require specialized heat sinking devices that allow for continual, substantially uninterrupted conduction and/or convection of the generated heat away from the controlled switching devices to avoid an unacceptable heat buildup.

Another type of AC-to-AC power converter is the reduced voltage starter. While reduced voltage starters, like AC drives, employ one or more controlled switching devices, reduced voltage starters generally provide less control over the power conversion process and ultimate output AC power than AC drives. For example, while able to modify the voltage and current of incoming power, reduced voltage starters are unable to modify the frequency or phase of incoming power. Consequently, reduced voltage starters generally are simpler to control and less expensive than AC drives.

A relatively recent advance in reduced voltage starter technology involved the development of the reduced voltage starter with bypass. It was recognized that, in reduced voltage starter applications, power control is only required during a relatively short transitional (or transient) time period between the commencement of providing power to a load and a time at which steady-state operation of the load is attained. This is often the case, for example, with respect to the delivery of power to motors used in pumping, conveyor belts, and elevator and escalator applications. Motors typically require a high degree of current during startup to produce high torque, which must be controlled to avoid unexpected results. Then, once the device attains a standard operating speed, the power demanded by the motor is maintained at a fairly constant, steady-state level, requiring less control.

A reduced voltage starter with bypass takes advantage of the fact that, in certain applications, control over the power conversion process need only be provided during the transitional mode of operation. Such reduced voltage starters include bypass relays/contacts that can be opened or closed and, when closed, shunt together the input and output terminals of the starters to one another (e.g., couple or short-circuit the power line and load terminals of the starter directly to one another) and thereby bypass or shunt out the controlled switching devices. When a reduced voltage starter with bypass is employed, the bypass relays are open during the transitional mode of operation so that the controlled switching devices can be employed to achieve the desired output AC power. Then, when the steady-state mode of operation has been attained, the bypass relays are closed so that the input AC power is directly provided as the output AC power to the load.

Because reduced voltage starters with bypass only utilize the controlled switching devices during the transitional mode of operation, the reduced voltage starters with bypass give off much less heat than both reduced voltage starters without bypass and AC drives, in which the controlled switching devices remain operational at all times whenever power is being delivered to the load. Thus, reduced voltage starters with bypass, though limited in terms of the types of applications (loads) with which they can be employed vis-à-vis AC drives in terms of the level of control that they are capable of providing, are at the same time both easier to control than AC drives and more efficient than both AC drives and reduced voltage starters without bypass.

Further, because reduced voltage starters with bypass only dissipate substantial amounts of power during the transitional mode of operation, and because the periods in which the starters are in their transitional mode are typically separated by long periods of steady-state operation in which there is relatively little heat dissipation (due to the operation of just the bypass relays), reduced voltage starters with bypass typically do not rely upon the same types of heat sinks as are commonly utilized in reduced voltage starters without bypass or AC drives. Instead of using specialized, large heat sinks designed to transport heat away from the controlled switching devices by conduction and then convection, reduced voltage starters with bypass rather employ large thermal masses (e.g., large blocks of copper) having enough heat capacity to absorb heat during the transitional mode of operation and then slowly dissipate that stored heat during the steady-state mode of operation, thereby resetting the thermal masses for the next transitional mode in the application.

Regardless of the type of AC-to-AC power conversion device that is employed, it is desirable in most if not all operating environments that such power conversion devices be minimized in their physical dimensions so that they can easily be installed/implemented in conjunction with other system components. Commonly, power conversion devices are installed on panels. When installed on such panels, the reduction of certain physical size characteristics of the power conversion devices becomes more important than the reduction of others. Namely, it becomes particularly desirable for the width and, to a lesser extent, the length of a power conversion device (as measured parallel to the panel's surface) to be minimized so that several power conversion devices or other devices can all be attached perpendicularly to the same panel, side by side, while the depth of power conversion devices (in terms of the distance that the device extends outward away from the panel) is of the least concern.

Despite this need for more compact AC-to-AC power conversion devices, existing AC-to-AC power conversion devices often remain fairly large. In particular with respect to AC drives and reduced voltage starters without bypass, where large amounts of heat are continuously generated, large heat sinks are typically used to allow for conduction and then convection of the generated heat away from the devices. In certain embodiments, fans, liquid cooling systems or other specialized components are also included for this purpose.

Further, reduced voltage starters in particular (in contrast to some AC drives) tend to be large insofar as they employ single-phase semiconductor-based AC switches in order to guarantee electrical isolation between different phases. That is, reduced voltage starters that are intended to convert multiple phases of power employ multiple physically-discrete switches, each of which includes its own dedicated housing/casing for containing the controlled switching devices used to convert a single respective phase of power and a corresponding thermal mass/heat sink for dissipating the heat generated by those particular controlled switching devices. For example, if three-phase input AC power is being converted by a reduced voltage starter into three-phase output AC power, three individual, physically-discrete AC switches are employed within the reduced voltage starter, with each switch handling one phase.

Additionally (also in contrast to some AC drives), reduced voltage starters typically employ large, discrete circuit components as their controlled switching devices, which typically can include power thyristors/silicon-controlled rectifiers (SCRs). Further, the power thyristors or other control switching devices typically are sandwiched between the thermal masses of the reduced voltage starters in the form of large, off-the shelf press pack structures. Thus, the large space occupied by reduced voltage starters when used for multi-phase applications is a result of both the fact that reduced voltage starters need multiple power modules to handle the multiple phases, and because each power module in itself is relatively large due to its individual housing and due to the large components that must be contained within that housing.

For these reasons, a need still exists for a new AC-to-AC power conversion device that is smaller than existing power conversion devices that provide comparable power conversion capabilities. In particular, given the special advantages provided by reduced voltage starters with bypass in comparison with AC drives and reduced voltage starters without bypass—namely, that reduced voltage starters with bypass are less complex and costly than AC drives and are more efficient than reduced voltage starters without bypass—a need still exists for an improved multi-phase reduced voltage starter with bypass that in particular is smaller than existing multi-phase reduced voltage starters with bypass.

BRIEF SUMMARY OF THE INVENTION

The present inventors have recognized that an improved multi-phase reduced voltage starter with bypass that is physically smaller than conventional multi-phase reduced voltage starters with bypass can be achieved by integrating and sharing various components associated with the different phases within a single power structure rather than employing multiple power structures that are respectively dedicated to handling the power associated with different phases. In particular, the present inventors have recognized that a single thermal mass can be shared by all of the controlled switching devices associated with different phases, without compromising the electrical isolation of those devices from one another, if such controlled switching devices are mounted upon the shared thermal mass by way of an electrically insulating, thermally conductive layer. By using a shared thermal mass with electrically isolated AC switches, the extra space required for housing and electrically isolating multiple thermal masses associated with multiple phases no longer is necessary.

Further, the present inventors have recognized that the integration of the components within the reduced voltage starter with bypass can be further improved by positioning the controlled switching devices and corresponding insulating layers associated with different phases in a manner that is oriented perpendicularly to the manner in which the input and output terminals/bus bars and bypass relays associated with those phases are oriented. Electrical isolation between components associated with different phases is achieved in part by a plastic housing that houses the controlled switching devices/insulators, while electrical connections between the controlled switching devices/insulators of each phase and the corresponding bus bars/bypass relays for the same phase are provided generally (in one embodiment) along a diagonal across the power structure. By orienting the controlled switching devices and corresponding insulating layers associated with different phases in this manner, the width of the power structure remains small despite the fact that the power structure has multiple controlled switching devices/insulators designed to handle multiple phases of power. At the same time, an advantageous, integrated parallel layout of the bus bars and bypass relays associated with different phases also is achieved. This configuration not only improves the integration and thus reduces the size of the overall power structure, but also it further enables efficient heat dissipation to the shared thermal mass.

In particular, the present invention relates to a power conversion system that includes first and second bus bars capable of being coupled respectively to first and second power lines, and third and fourth bus bars capable of being coupled respectively to first and second load terminals. The system further includes first and second switching devices coupled between the first and third bus bars and between the second and fourth bus bars, respectively, and third and fourth switching devices coupled between the first and third bus bars and between the second and fourth bus bars, respectively. When the third switching device is closed, the first and third bus bars are shunted to one another, and when the fourth switching device is closed the second and fourth bus bars are shunted to one another. The system additionally includes at least one intermediate portion to which the first and second switching devices are respectively attached, and a first mass to which the at least one intermediate portion is attached, where at least a majority of the heat generated by the first and second switching devices is transferred to the first mass by way of the at least one intermediate portion, and where the first mass has a heat capacity that is sufficient to at least temporarily store substantially all of the heat energy transferred to it from both of the first and second switching devices.

The present invention further relates to a reduced voltage starter with bypass that includes first, second and third switching devices coupled between first, second, and third pairs of ports, respectively, and first, second, and third bypass means for shunting the first, second and third pairs of ports to one another during a steady-state mode of operation. The reduced voltage starter with bypass further includes a thermal energy receiving device that receives thermal energy generated by at least two of the first, second and third switching devices during a transitional mode of operation, and means for electrically isolating the first, second and third switching devices from one another, where the means for electrically isolating is coupled at least indirectly to each of the first, second and third switching devices and to the thermal energy receiving device.

The present invention additionally relates to a method of power conversion that includes receiving AC power at first and second input ports, where the AC power received at the first input port is associated with a first phase and the AC power received at the second input port is associated with a second phase, and converting the received power so that at least one characteristic of the received power is modified, where the converting is performed by first and second primary switching devices coupled to the first and second input ports. The method further includes conducting thermal energy away from the first and second primary switching devices to a shared thermal mass, where the first and second primary switching devices are electrically isolated from one another, and outputting the converted, received power at first and second output ports respectively coupled to the first and second primary switching devices. The method additionally includes closing first and second secondary switching devices coupled in parallel respectively with the first and second primary switching devices so that the first input and output ports are shunted to one another and the second input and output ports are shunted to one another.

The present invention further relates to a method of constructing a reduced voltage starter with bypass that includes affixing first, second and third primary switching devices to first, second, and third intermediate components, affixing the first, second, and third intermediate components upon a thermal mass, and coupling first, second and third secondary switching devices in parallel respectively with the first, second and third primary switching devices between first, second and third pairs of ports, respectively. The intermediate components are thermally conductive so that thermal energy is capable of flowing from the first, second and third primary switching devices to the thermal mass, and the intermediate components are electrically insulating to electrically isolate the first, second and third primary switching devices from the thermal mass and from one another.

The present invention additionally relates to an integrated power structure for performing power conversion. The power structure includes a housing, a thermal mass to which the housing is affixed, and a plurality of input bus bars and a plurality of output bus bars, where all of the bus bars are supported by the housing. The power structure further includes a plurality of primary switching circuits governing power conversion, where all of the switching circuits are substantially contained within a cavity formed between the housing and the thermal mass, and a plurality of secondary switching circuits capable of shunting the input bus bars with corresponding ones of the output bus bars, where each of the secondary switching circuits is supported by at least one of the primary switching circuits, the bus bars and the housing.

The present invention further relates to an apparatus for use in a reduced voltage starter that includes a housing for substantially containing a plurality of switching circuits within an interior of the housing, and a plurality of orifices within the housing by which a plurality of contacts can extend from the plurality of switching circuits to an exterior of the housing. The apparatus further includes a plurality of channels formed along the exterior of the housing, and a plurality of conductors positioned within the plurality of channels along the exterior of the housing, where each of the conductors is coupled to a respective one the contacts, and each of the conductors is electrically isolated from the other conductors.

DETAILED DESCRIPTION OF THE INVENTION

Figure 1:
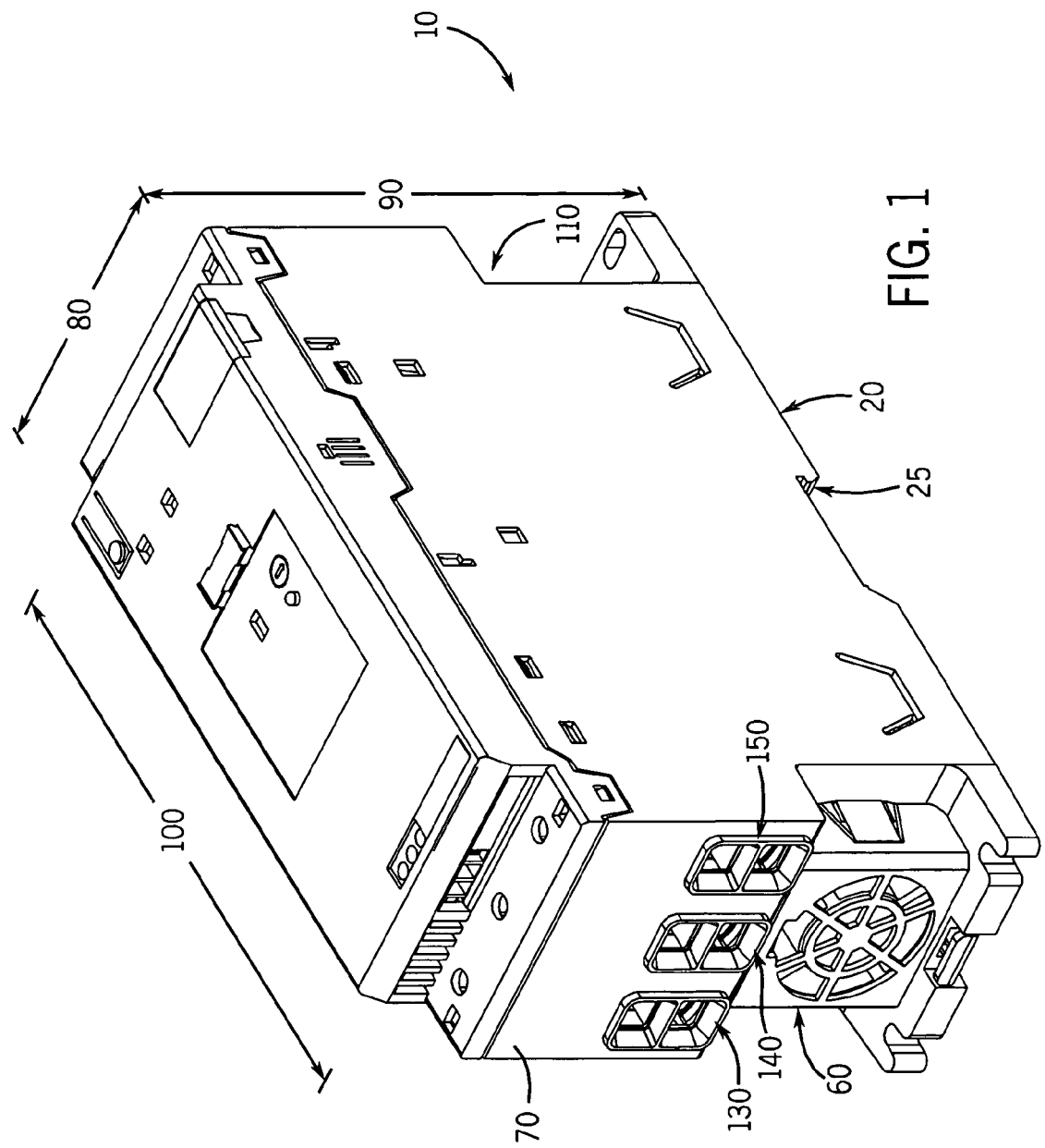
FIG. 1 is a perspective view of an exemplary multi-phase reduced voltage starter with bypass in accordance with an embodiment of the present invention.

Referring to FIG. 1, one exemplary embodiment of a reduced voltage starter with bypass 10 in accordance with the present invention is shown to be a SMC 3 reduced voltage starter with bypass manufactured by Rockwell Automation of Milwaukee, Wis. Other exemplary embodiments could include, for example, a Delta Frame 2 reduced voltage starter with bypass, or a SMC Flex Frame 1 reduced voltage starter with bypass, both of which are also manufactured by Rockwell Automation. As shown, the reduced voltage starter with bypass 10 includes an outside housing 20, an interface side 25, and first and second ends 110 and 70, respectively. At the second end 70 are first, second and third output AC power bus bars 130, 140 and 150 (which also constitute terminals/ports of the starter) for providing three phases of AC power, and a cooling apparatus such as a fan 60. Opposite the second end 70 at the first end 110 are first, second and third input AC power bus bars 30,40 and 50 (see FIG. 2). In accordance with the present invention, the outside housing 20 contains an integrated, multi-phase power structure 120 that is described in further detail below with reference to FIGS. 3–10.

The interface side 25 of the reduced voltage starter with bypass 10 is configured to be attached to a panel as commonly employed in the art, to which multiple devices including other power conversion devices and control devices can also be coupled (not shown). The reduced voltage starter 10 generally has a width 80, a depth 90 and a length 100. Because it is desirable to be able to couple multiple devices onto a panel, typically in a side-by-side manner, it is typically desirable for the reduced voltage starter 10 to have as small of a width 80 as possible. To a lesser extent, it is desirable for the length 100 of the reduced voltage starter 10 to be minimized. Minimizing the depth of the starter 10 is of the least importance, since the depth merely determines how far outward from the panel the starter extends, which normally is of less concern. In the embodiment shown, the length 100 of the reduced voltage starter 10 happens to be the largest dimension, followed by the depth 90 and then the width 80 in terms of overall size (in the present embodiment, the width of the starter 10 is 72 mm). As is described in further detail below with reference to FIGS. 3–10, the integrated power structure 120 (in accordance with certain embodiments of the present invention) facilitates the reduction in overall size of the reduced voltage starter with bypass 10, and particularly facilitates the reduction in its width, in comparison with conventional reduced voltage starters with bypass.

Figure 2:
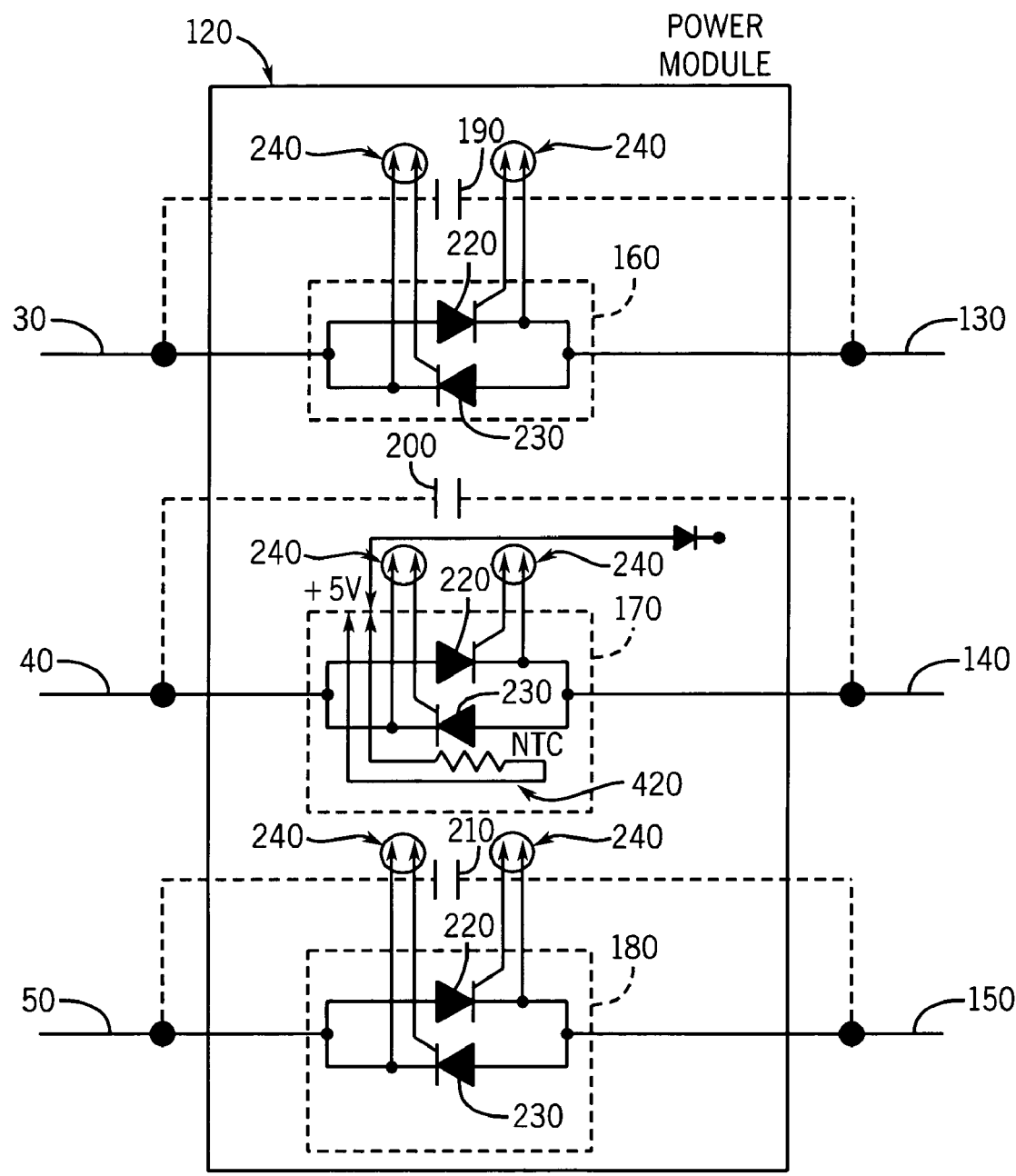
FIG. 2 is a schematic showing exemplary circuit components contained within the multi-phase reduced voltage starter with bypass of FIG. 1.

Referring to FIG. 2, a schematic shows some of the electrical components that are contained within the reduced voltage starter with bypass 10 of FIG. 1. In particular, as shown, each of the input AC power bus bars 30, 40 and 50 are coupled to corresponding output AC power bus bars 130, 140 and 150, respectively, by first, second and third AC switching circuits 160, 170 and 180, respectively (which also can simply be termed AC switches), and further by first, second and third bypass relays 190, 200 and 210, respectively. The first, second and third bypass relays 190, 200 and 210 are respectively coupled in parallel with the first, second and third switching circuits 160, 170 and 180, respectively. Additionally, each of the switching circuits 160, 170 and 180 and relays 190, 200 and 210 is controlled by one or more control devices (not shown), which can include, for example, a microprocessor, a computer, a programmable logic device (PLD) or any of a variety of other control mechanisms or circuitry. In the embodiment shown, the control devices are included as part of the reduced voltage starter with bypass 10 (e.g., housed within the outside housing 20 above the bypass relays 190–210) although, in alternate embodiments, the control devices are external to the reduced voltage starter with bypass and can be coupled to the starter by way of one or more ports located on the housing.

In the embodiment shown, each of the first, second and third AC switching circuits 160, 170 and 180 includes a pair of power thyristors/silicon-controlled rectifiers (SCRs) 220, 230 that are coupled in anti-parallel with one another or back to back between the respective pairs of corresponding input and output AC power bus bars 30,130, 40,140 and 50,150, respectively. Each of the power thyristors 220,230 is controlled in its operation (e.g., its firing) by way of control lines 240 that are coupled to the one or more control devices (not shown). The power thyristors 220, 230 are controlled by the control device(s) to provide appropriate conversion of the input power provided by way of the input AC power bus bars 30, 40 and 50 to provide desired output power at the output AC power bus bars 130, 140 and 150 as is known in the art. For example, voltage or current characteristics of the input power can be modified. Bus bars such as those shown in the present FIGS. are generally intended to encompass any metallic or other conductor that forms a common junction between two or more electrical circuit components.

The power thyristors 220, 230 are only operated to provide power conversion during a transitional mode of operation during which each of the relays 190, 200 and 210 are controlled to be open. Once the output power demanded by the load coupled to the output AC power bus bars 130, 140 and 150 reaches a steady state (e.g., in the case of a motor load, once the motor's speed has ramped up to a steady speed such that the current demanded by the motor drops to less than 120% of its rated level), each of the relays 190, 200 and 210 is closed to shunt (or directly couple or intentionally cause a short to exist between) the corresponding pairs of input and output AC power bus bars 30, 130, 40, 140 and 50, 150, respectively. The transition from the transitional mode of operation to the steady-state mode of operation is coordinated with the gating of the power thyristors 220,230 to prevent making or breaking of the bypass under load, allowing for bypass relays 190–210 to be smaller relays (e.g., low-voltage relays) capable of carrying but not making or breaking line current. The relays 190, 200 and 210 are shown to be normally-open contacts but, in alternate embodiments, can be normally closed contacts. The AC switching circuits 160–180 and bypass relays 190–210 associated with the multiple phases of the reduced voltage starter with bypass 10 are contained within the single outside housing 20 shown in FIG. 1.

Figure 3:
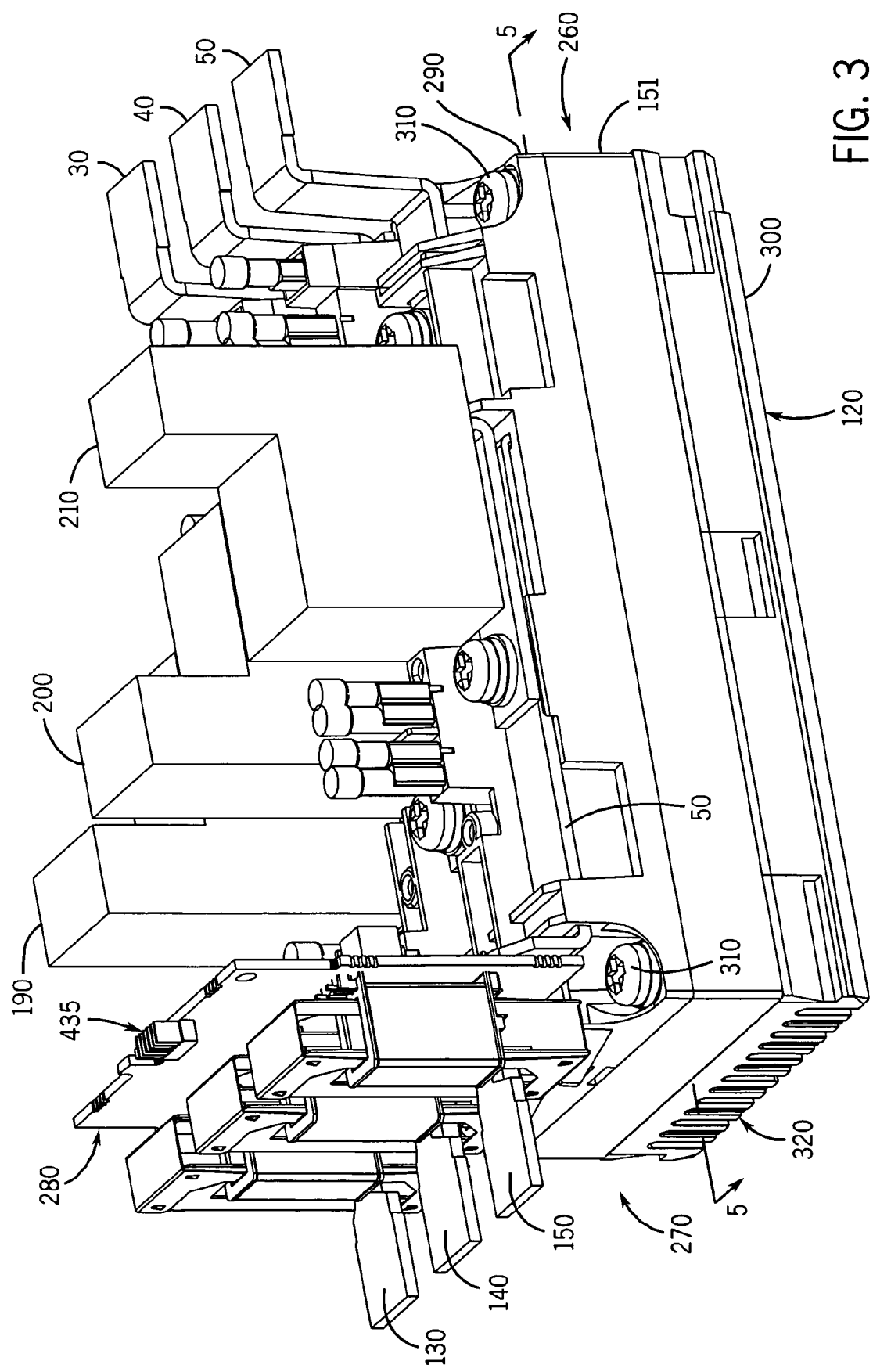
FIG. 3 is a perspective view of components forming an integrated power structure housed within the multi-phase reduced voltage starter with bypass of FIG. 1.
Figure 4:
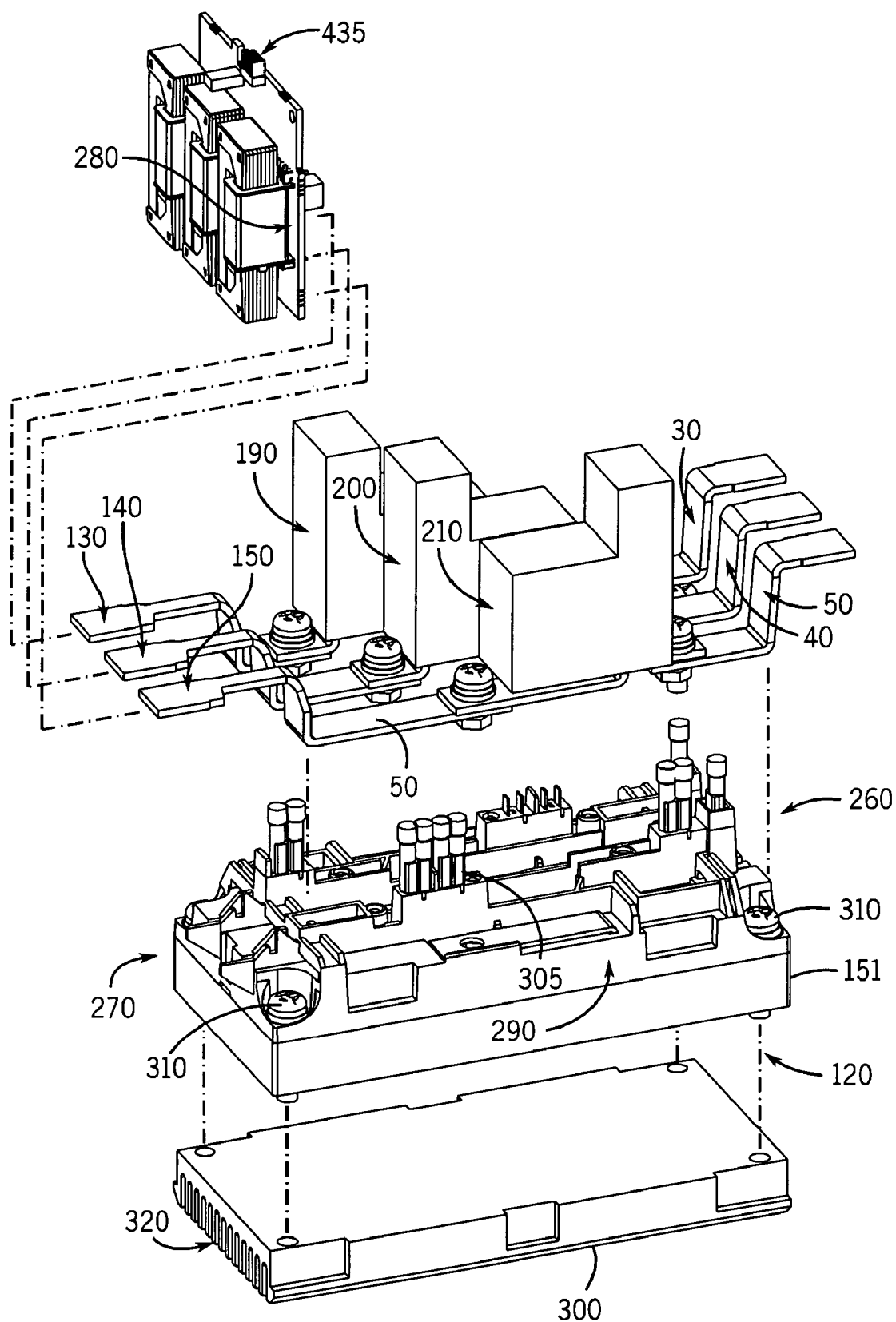
FIG. 4 is a perspective, exploded view of the components shown in FIG. 3.

In contrast to conventional reduced voltage starters with bypass, the AC switching circuits 160–180 associated with the different phases of the starter 10 are integrated along with additional components as part of a single, multi-phase integrated power structure 120 as shown in FIGS. 3 and 4 in assembled and exploded views, respectively. As shown in FIGS. 3 and 4, the integrated power structure 120 includes the bypass relays 190–210, and also includes the pairs of input and output AC power bus bars 30,130, 40,140 and 50,150. In the embodiment shown, the input bus bars 30–50 are at a first end 260 and the output bus bars 130–150 are at a second end 270 opposite the first end, where the first end 260 corresponds to the first end 110 shown in FIG. 1 of the overall reduced voltage starter with bypass 10. Also, the integrated power structure 120 includes a shared thermal mass 151, a plastic housing 290 affixed to the shared thermal mass, a current transformer (CT) circuit board 280 coupled to the plastic housing 290 for providing current/electrical feedback that is supported by the plastic housing, and a heat sink 300 that is also coupled to the shared thermal mass.

Figure 5:
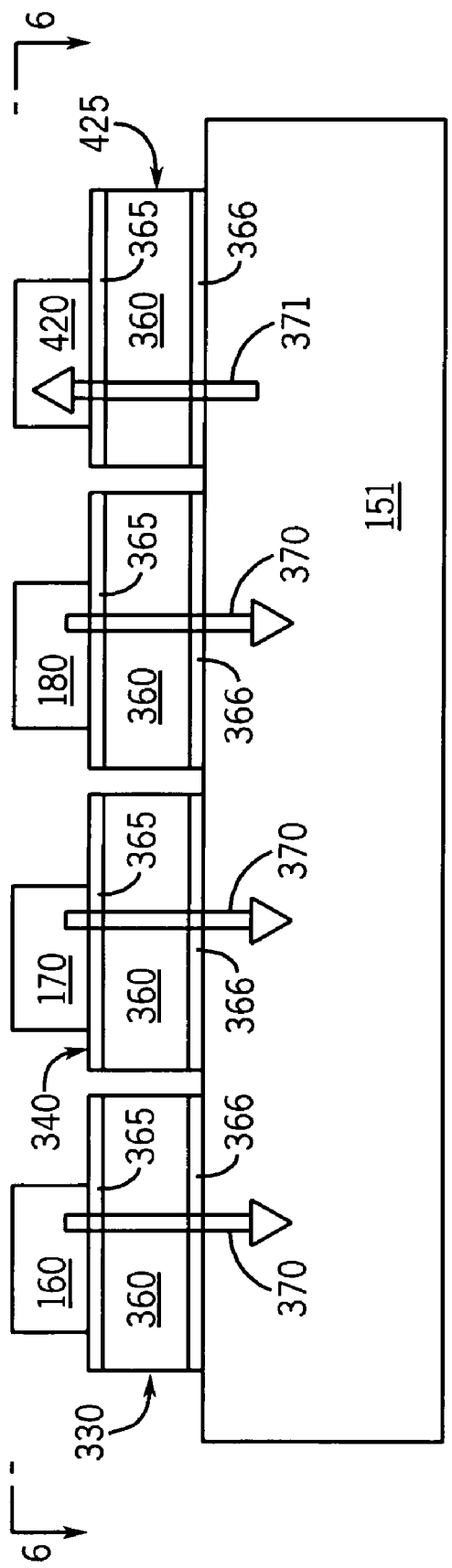
FIG. 5 is a side elevation view (not drawn to scale) of certain of the components forming a power module of the power structure of FIG. 3, taken along line 5—5 of FIG. 3.
Figure 6:
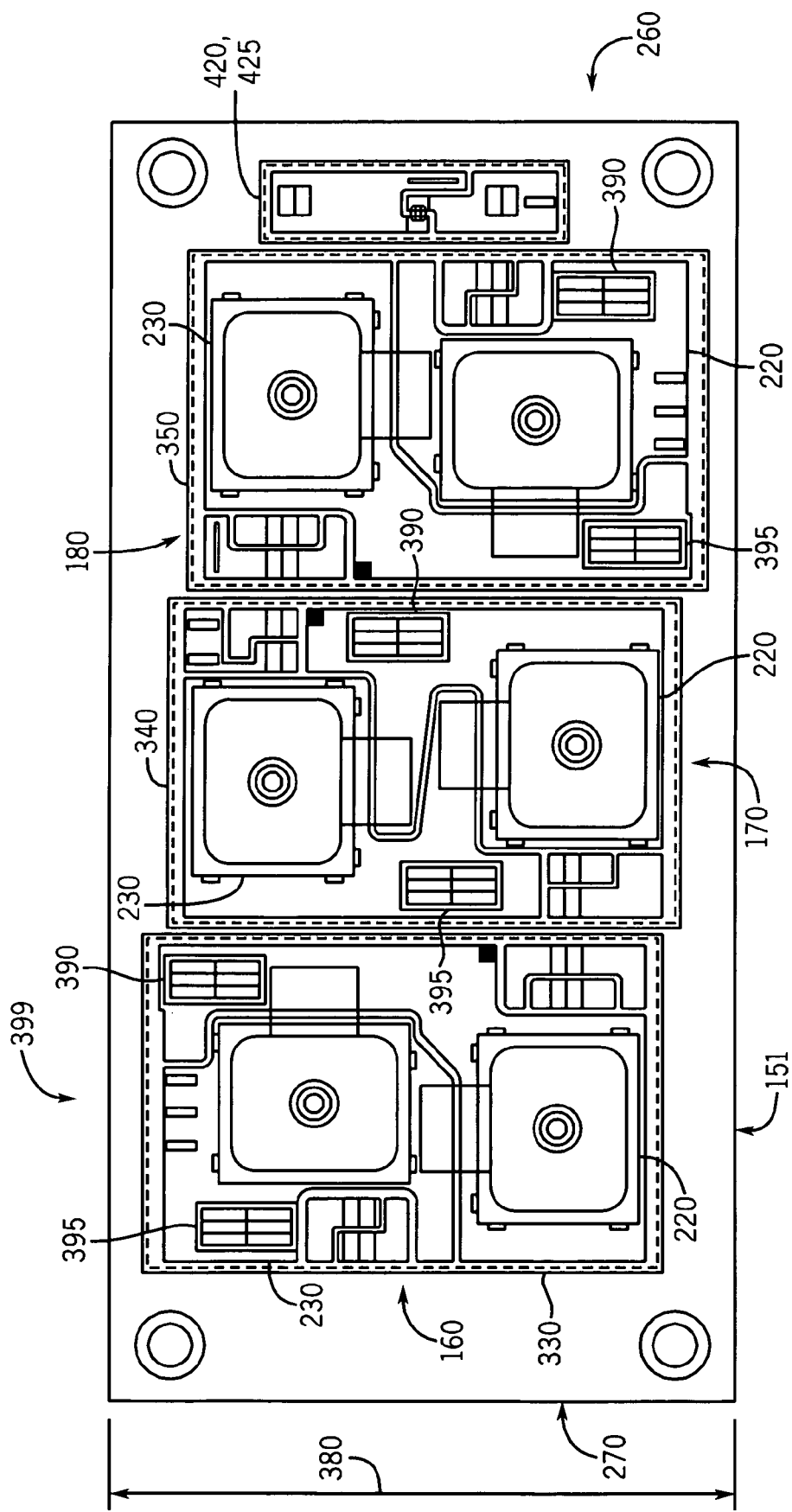
FIG. 6 is a top view of an exemplary layout of the components shown in FIG. 5, as viewed along line 6—6 of FIG. 6.

Although not shown in FIGS. 3 and 4, but as shown in FIGS. 5 and 6, the power structure 120 further includes the AC switching circuits 160–180 and corresponding DCB substrates 330–350, along with a NTC resistor 420 providing thermal feedback and corresponding DCB substrate 425, all of which are contained within the combined assembly of the plastic housing 290 (along with silicone gel potting injected into the housing) and the shared thermal mass 151. As described further below, various interface terminals are provided along the plastic housing 290 and the CT circuit board 280 for allowing control signals to be provided from one or more control device(s) to the AC switching circuits and the bypass relays, and feedback connections for allowing the current/electrical and thermal feedback to be provided to the one or more control device(s). Integrated in this manner, the power structure 120 constitutes a small, robust package. All of these components forming the integrated power structure 120 are in turn placed within the overall housing 20 (which also can be plastic). The plastic housing

290 and the shared thermal mass 151, together with the circuit components contained within them, can further be considered further to form a distinct power module.

One manner in which the power structure 120 is integrated is by employing a single thermal mass to receive heat from each of the AC switching circuits associated with the different phases of power (e.g., in this case, the switching circuits 160, 170 and 180 associated with three different phases, although in alternate embodiments there can be only two phases or more than three phases). In particular as shown in FIGS. 5 and 6, each of the AC switching circuits 160–180 associated with three different phases of power are supported by and affixed upon the single thermal mass 151 by way of the respective thermally-conductive DCB substrates 330, 340 and 350. By implementing the AC switching circuits 160, 170 and 180 of the different phases in this manner, electrical isolation between the different AC switching circuits (and between those circuits and ground) is maintained despite their being thermally coupled to and supported by the same thermal mass.

Additionally, each of the AC switching circuits 160, 170 and 180 associated with the different phases is a small, integrated-circuit-type device and further is implemented in connection with its respective DCB substrate 330, 340 or 350 in an integrated manner that facilitates the connection of the thyristors 220, 230 with the outside world. In particular, the AC switching circuits 160–180 are electrically coupled to the DCB substrates 330–350, which in turn are electrically coupled to control terminals and power terminals by which the AC switching circuits are coupled to the control device (s). Given their design, all of the AC switching circuits 160–180 can be electrically isolated from one another despite being situated closely next to one another upon their respective DCB substrates 330–350. In particular, the AC switching circuits 160–180 are isolated from one another due to the structure of the DCB substrates 330–350, which insulate the AC switching circuits from the thermal mass 151, and by way of the single plastic housing 290 and silicone gel potting contained within the housing. Although, in FIG. 2, power thyristors are shown as the controlled switching devices that are included within the AC switching circuits 160–180, in alternate embodiments other devices can be employed instead of power thyristors such as, for example, Gate Turn-Offs (GTOs) and other known semiconductor switching devices and other types of switching components.

This implementation of the AC switching circuits 160–180, both in terms of their being supported upon a shared thermal mass and in terms of their being implemented as integrated AC switch circuits, is advantageous in comparison with conventional reduced voltage starters with bypass in that it allows for the starter 10 to be of a smaller overall size than a comparable conventional reduced voltage starter. In particular, because the AC switching circuits 160–180 each are isolated from one another and from the shared thermal mass 151, multiple thermal masses associated with the respective switching devices need not be employed and, additionally, separate insulating layers or housings to separate such thermal masses are not necessary. Likewise, because the AC switching circuits 160–180 are implemented as integrated AC switch circuits, electrical isolation between the AC switching circuits themselves and from the shared thermal mass 151 is maintained by the thin, electrically insulating DCB substrates 330–350 and by the relatively small and thin single plastic housing 290 (with internal silicone gel). Additional aspects of the configuration of the AC switching circuits 160–180 in conjunction with the remainder of the power structure 120 and the plastic housing 290 that allow the reduced voltage starter with bypass 10 to be further reduced in size relative to conventional reduced voltage starters with bypass are described in detail below with reference to FIGS. 5 and 6.

Referring to FIG. 5, a cross sectional view is provided of the thermal mass 151 and certain internal components contained within the plastic housing 290 taken along line 5—5 of FIG. 3. In particular, FIG. 5 shows that the AC switching circuits 160, 170 and 180 are respectively supported by the first, second and third DCB substrates 330, 340 and 350. Also, the NTC resistor 420 (or other heat sensing device for providing thermal feedback) is supported by its own fourth DCB substrate 425. Each of the DCB substrates 330–350 and 425 includes a respective inner layer 360 made from a thermally conductive but electrically insulating material, for example, aluminum oxide or a similar ceramic material. Additionally, each of the DCB substrates 330–350 and 425 has first and second outer layers 365 and 366, respectively, of etched copper or a similar material to which it is possible to attached other devices by way of solder. Thus, as shown in FIG. 5, the first, second and third AC switching circuits 160, 170 and 180 and NTC resistor 420 respectively are attached to the first layers 365 of the respective DCB substrates 330, 340, 350 and 425, while each of the second layers 366 of the respective DCB substrates in turn are attached to the thermal mass 151.

In a preferred embodiment, the attachment of the AC switching circuits 160–180, NTC resistor 420 and thermal mass 151 to the DCB substrates 330–350 and 425 is achieved through the use of lead-free solder. Further, the soldering itself can be performed by way of vacuum-type soldering techniques, such that voids are entirely or almost entirely eliminated from the various solder joints, and such that the thermal impedances of those joints are minimized. In alternate embodiments, other soldering or attachment techniques can be utilized to coupled the AC switching circuits 160–180 and thermal mass 151 to the DCB substrates 330–350. Further, in alternate embodiments, other substrate-type portions can be substituted for the DCB substrates, so long as the substituted materials were both thermally conductive and electrically insulating.

Each of the AC switching circuits 160–180, NTC resistor 420, and corresponding DCB substrates 330–350 and 425 (including portions 360, 365 and 366) along with silicone gel is contained within the single plastic housing 290, which electrically isolates each set of AC switching circuit/DCB substrate (e.g., components 160 and 330, components 170 and 340 and components 180 and 350) from one another as well as from the NTC resistor and its DCB substrate. Because the inner layers 360 of the DCB substrates 330–350 are insulating, the electrical isolation of each of the first, second and third AC switching circuits 160, 170 and 180 is not undermined by the connection of those devices to the DCB substrates or to the shared thermal mass 151. Rather, in addition to being electrically isolated from one another, each of the AC switching circuits 160–180 is also isolated from the shared thermal mass 151 and from ground. Thus, each of the AC switching circuits 160–180 (and each of the power thyristors or other electrical devices included within those AC switching circuits) can be supported upon the same thermal mass 151 within the same reduced voltage starter with bypass 10 such that each of the multiple phases (e.g., in this embodiment, three phases) of AC power communicated and converted by the starter are electrically isolated from one another.

Although the DCB substrates 330–350 are electrically insulating, the DCB substrates 330–350 (and any solder existing in between the DCB substrates and the AC switching circuits 160–180 or thermal mass 151, which is not shown) are nonetheless thermally conductive and consequently conduct substantially all (e.g., at least 70%) of the heat generated by the AC switching circuits 160–180 to the thermal mass 151. This is possible for two reasons. First, the thermal mass 151 is a relatively large component (e.g., 65 mm wide by 138 mm long by 15 mm thick) of an appropriate material having relatively high heat capacity, for example, copper, steel or aluminum, such that the overall heat capacity of the thermal mass is sufficient to absorb substantially all of (or at least a majority of) the heat generated from the AC switching circuits 160–180 during the transitional mode of operation. Second, because the operation of the reduced voltage starter with bypass 10 is such that the AC switching circuits 160–180 are only on for relatively short periods of time during the transitional mode of operation, the thermal mass 151 is not required to absorb power continuously without end. Rather, the thermal mass 151 is provided with substantially all of the thermal energy that is generated by the AC switching circuits 160–180 during the transitional mode of operation, and then the thermal mass transfers its heat to the heat sink 300 that in turn dissipates the heat by way of conduction/convection to the ambient of the starter 10 during the steady-state mode of operation, effectively resetting the thermal mass for the next transitional period.

Because the heat sink 300 has a large period of time in which to dissipate the heat within the thermal mass 151, the heat sink need not be as large or specialized as heat sinks used in conventional AC drives or reduced voltages starters. During the steady-state mode of operation, relatively little heat energy is generated by the circuitry shown in FIG. 2, e.g., on the order of $\frac{1}{10}^{th}$ of the heat generated by the AC switching circuits 160–180 during the transitional mode of operation (for example, in one embodiment, 82 Watts is generated during the steady-state mode of operation while 810 Watts is generated during the transitional mode of operation). Moreover, the heat that is generated during steady-state mode of operation is generated by the bypass relays 190–210 rather than the AC switching circuits 160–180, and this heat can be and is dissipated primarily by conduction out away from the starter 10 simply by way of the bus bars 30–50 and 130–150 and attached input and output power conductors. Through the use of this integral design for a multi-phase reduced voltage starter with bypass, a reduction in panel area per horsepower (or kilowatt rating) is achieved, which results in reduced installation size and costs to the customer with respect to the installation of components such as the starter onto a panel.

In the present embodiment, the heat sink 300 is attached under the thermal mass 151. Unlike the attachment of the thermal mass 151 to the DCB substrates 330–350 and plastic housing 290, which is integral, the heat sink 300 is only bolted to the thermal mass by way of bolts 310. Depending upon the embodiment, a thermal interface pad (not shown) also can be positioned between the heat sink 300 and the thermal mass 151. The heat sink 300 can take any of a number of forms and, in the present embodiment, conducts heat away from the thermal mass 151 towards the fan 60. As shown, the heat sink 300 has a series of channels or fins 320 such that cool air blown by the fan 60 can pass through the fins and remove heat from the heat sink. Thus, although the heat sink 300 does have some heat capacity of its own, its primary purpose is to dissipate the heat from the thermal mass 151 to the ambient, effectively resetting the thermal mass for the next time it enters the transitional mode.

Turning to FIG. 6, a top view of the components shown in FIG. 5 (taken along line 6—6 of FIG. 5) shows in greater detail how the AC switching circuits 160–180 and the NTC resistor 420 are laid out in one embodiment along the thermal mass 151. In particular, as shown, the first and second power thyristors 220, 230 of each of the AC switching circuits 160–180 are laid out, side by side, within a rectangular area defined by the DCB substrates 330–350, which in turn are affixed to the thermal mass 151. In the present embodiment, the DCB substrates 330 and 350 differ from the DCB substrate 340 in regard to top side positioning but are identical to one another in shape, in order to provide for more cost-effective manufacturing. However, in alternate embodiments, each of the DCB substrates 330–350 can be different from one another in shape. The NTC resistor 420 is further attached to the thermal mass 151 next to the AC switching circuit 180 by way of its DCB substrate 425.

Also as shown, the layout of the AC switching circuits 160–180 and DCB substrates 330–350 corresponding to the respective phases is perpendicular to the layout of the bus bars 30–50 and 130–150 corresponding to the respective phases, in order to minimize the overall width of the power structure 120 and thus minimize the width 80 of the reduced voltage starter with bypass 10. That is, the first AC switching circuit 160 and DCB substrate 130 corresponding to the bus bars 30 and 130 (e.g., a first phase) is positioned proximate the second end 270 of the power structure 120/thermal mass 151, the third AC switching circuit 180 and DCB substrate 150 corresponding to the bus bars 50 and 150 (e.g., a third phase) is positioned proximate the first end 260 of the power structure/thermal mass, and the second AC switching circuit 170 and DCB substrate 140 is positioned in between the other two. Connections among different terminals of the thyristors 220,230 forming the AC switching circuits 160–180 are achieved, in the embodiments shown, by way of trimetal connections although, in alternate embodiments, other types of connections mechanisms can be used (e.g., bond wires).

Figure 7:
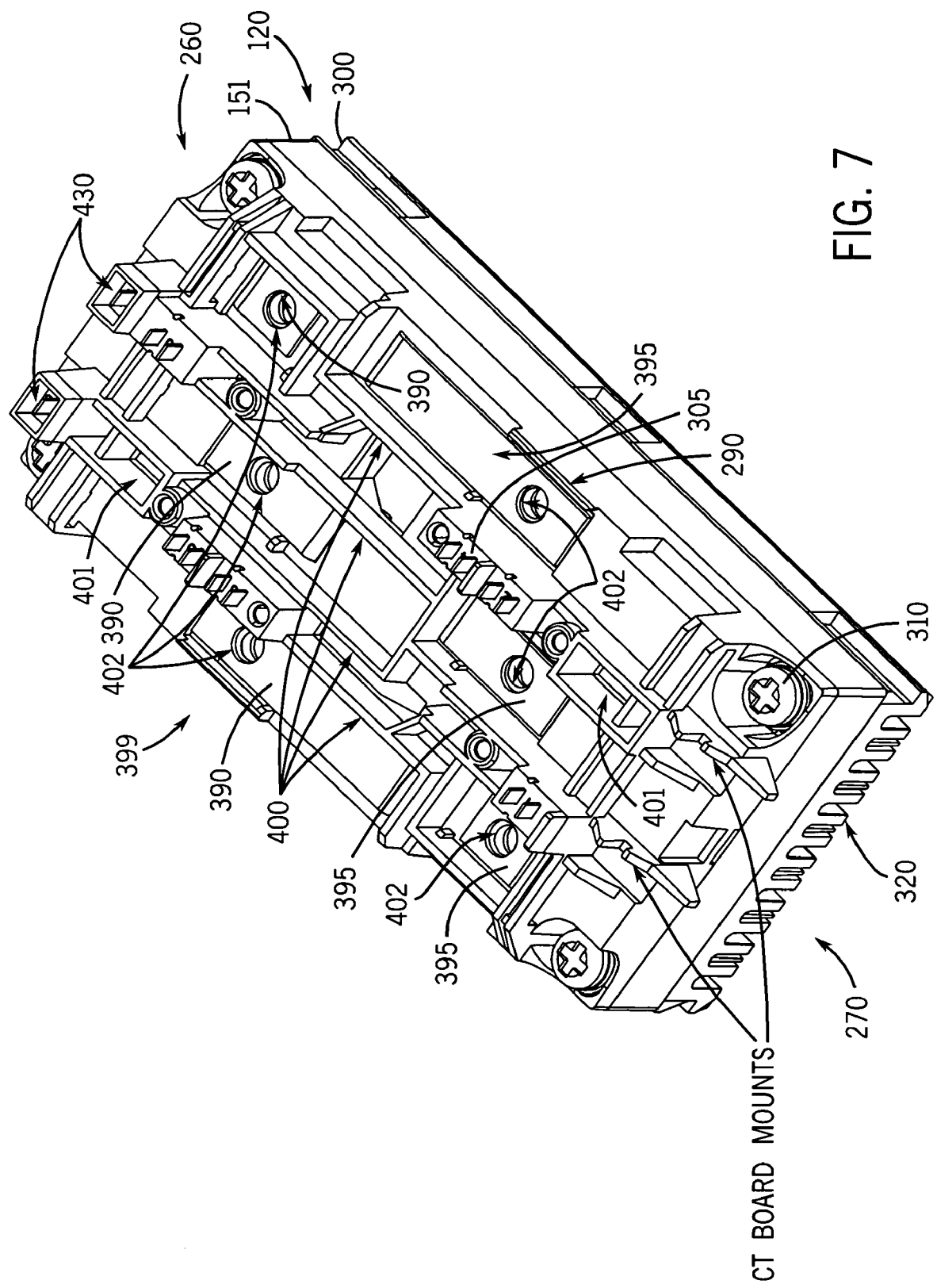
FIGS. 7–10 are further perspective views of portions of the power structure of FIG. 3 in varying degrees of assembly.

Referring still to FIG. 6, and additionally to FIG. 7, each of the DCB substrates 330–350 corresponding to each of the AC switching circuits 160–180 has first and second tabs 390 and 395, respectively, that are designed to extend upward and out of the plastic housing 290 when the plastic housing is positioned over the AC switching circuits. The respective tabs 390,395 of each of the AC switching circuits 160–180 are electrically coupled, respectively, to the first and second thyristors 220 and 230 of the respective AC switching circuit, and thus effectively constitute the terminals of those thyristors as manifested to devices outside the plastic housing. Once the plastic housing is in position, the tabs 390,395 are folded over to form contact pads for the bus bars 30–50 and 130–150 and the bypass relays 190–210. That is, each tab 390 or 395 forms a contact pad by which the tab is in turn electrically and physically coupled to a corresponding one of the bus bars 30–50 and 130–150 and a corresponding one of the bypass relays 190–210. As discussed further below, each set of coupled tab, bus bar, and bypass relay in the present embodiment are attached together with one screw and nut.

Figure 9:
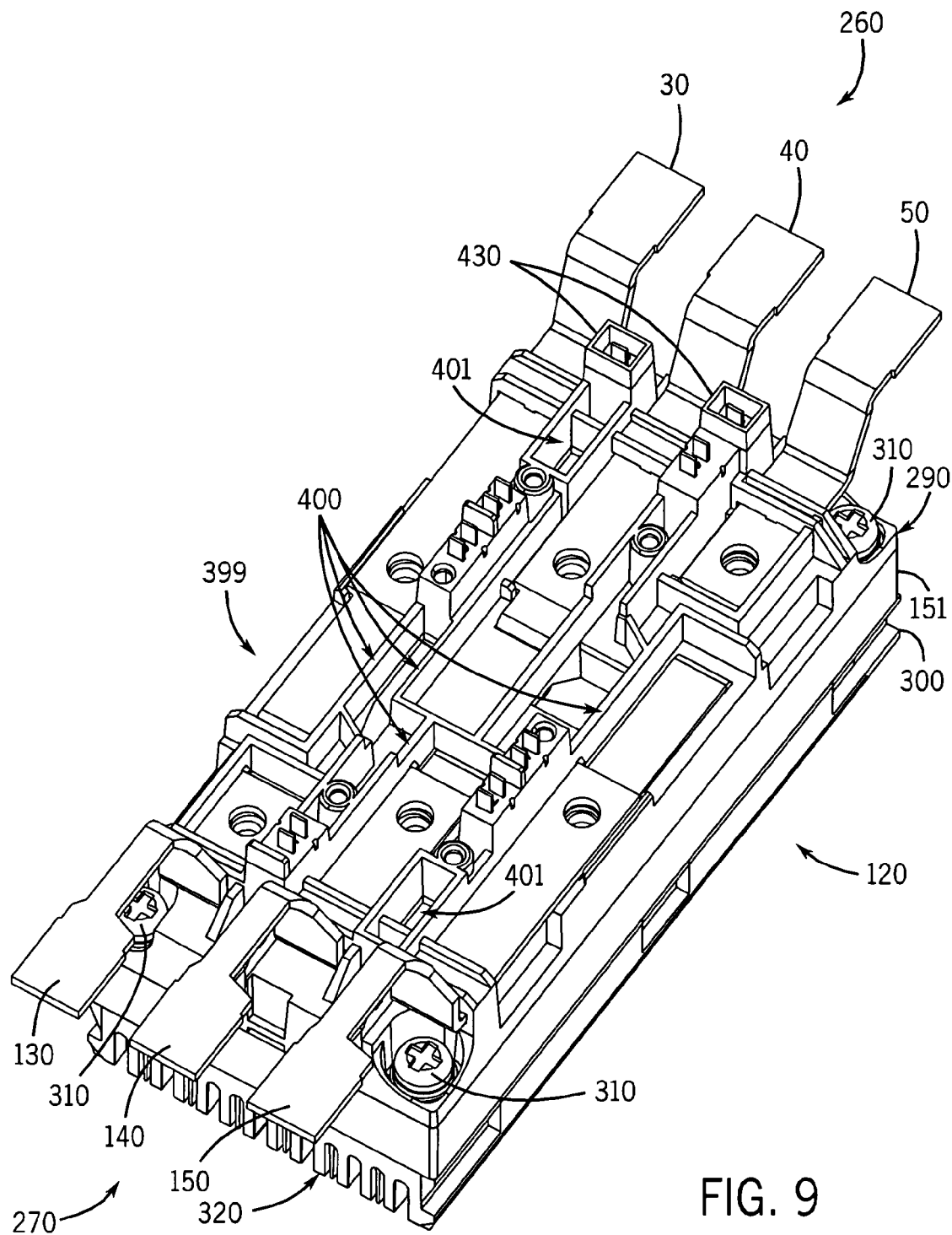

Further, each pair of the tabs 390,395 associated with each of the AC switching circuits 160–180 handling each different phase is generally positioned along the width of the plastic housing 290 (e.g., at different positions along an axis 380 as shown in FIG. 6) for alignment with the bus bars and bypass relays/terminals of the corresponding phase. In the embodiment shown, the alignment is such that the tabs linking the components associated with the different phases are positioned in a generally-diagonal manner across the plastic housing 290/thermal mass 151 (although, in alternate embodiments, the locations of the different AC switching circuits corresponding to the different phases could be juggled such that the tabs would not necessarily follow this diagonal pattern). Thus, for example, the first and second tabs 390,395 associated with the first AC switching circuit 330 and thus associated with the bus bars 30,130 are positioned proximate a first side 399 of the thermal mass 151 as shown in FIG. 6 in the absence of the plastic housing. Consequently, as shown in FIG. 7 with the plastic housing 290 now in place, those same first and second tabs 390,395 are shown along the first side 399 to be folded over to form contact pads for the first input AC power bus bar 30 and the first output AC power bus bar 130, respectively. FIG. 9 in turn shows the power structure 120 with the bus bars 30 and 130 in place.

By distributing the AC switching circuits 160–180 and corresponding DCB substrates 330–350 associated with the different phases perpendicularly in relation to the distribution of the bus bars 30–50 and 130–150 and bypass relays 190–210 associated with those different phases, several goals are achieved. First, the width of the power structure 120 and, ultimately, the width 80 of the reduced voltage starter with bypass 10 remains small despite the fact that the power structure is capable of handling multiple phases of power. At the same time, an advantageous, integrated parallel layout of the bus bars and bypass relays associated with different phases also is achieved, which helps to reduce the length of the power structure and, ultimately, the length 90 of the reduced voltage starter with bypass 10. Further, this configuration not only improves the integration and thus reduces the size of the overall power structure, but also it further enables efficient heat dissipation to the shared thermal mass 151.

Referring to FIGS. 7–10, the power structure 120 is shown to incorporate certain other features that facilitate the robustness and proper operation of the module despite its compactness and numerous components. In particular, the plastic housing 290 includes mechanical connections for its components and, in particular, includes plastic grooves into which are slid the bus bars 30–50 and 130–150. The grooves are formed in between multiple ribs 400 that extend upward in between neighboring tabs 390,395 and neighboring bus bars 30–50 and 130–150, which assist in maintaining electrical isolation between the different phases of the reduced voltage starter with bypass 10. Also, the plastic housing 290 includes several venting channels 401 above the locations of several of the power thyristors 220,230 to allow for gas expansion and release during short-circuit events to prevent phase-to-phase or phase-to-ground isolation to be breached. The vent channels 401 are holes within the plastic housing 290 such that the AC switching circuits 160–180 are not entirely sealed within the plastic housing. Additionally, the plastic housing is formed to provide spaces for captured nuts 402 (see FIG. 7) to be positioned under the folded-over tabs 390,395. The captured nuts 402 receive screws by which the bus bars 30–130 and 50–150 and bypass relays 190–210 are coupled to the tabs 390,395.

Figure 8:
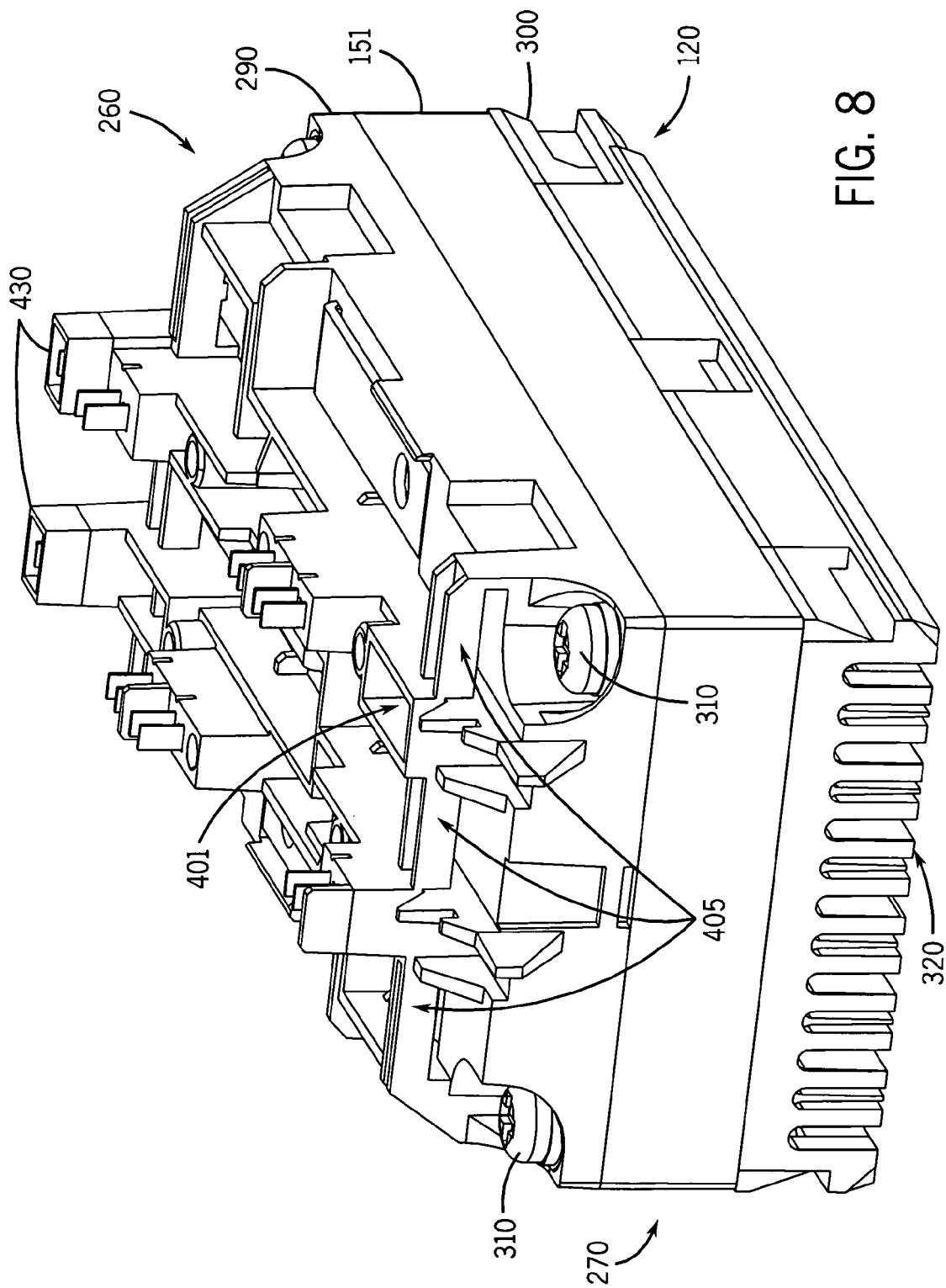
Figure 10:
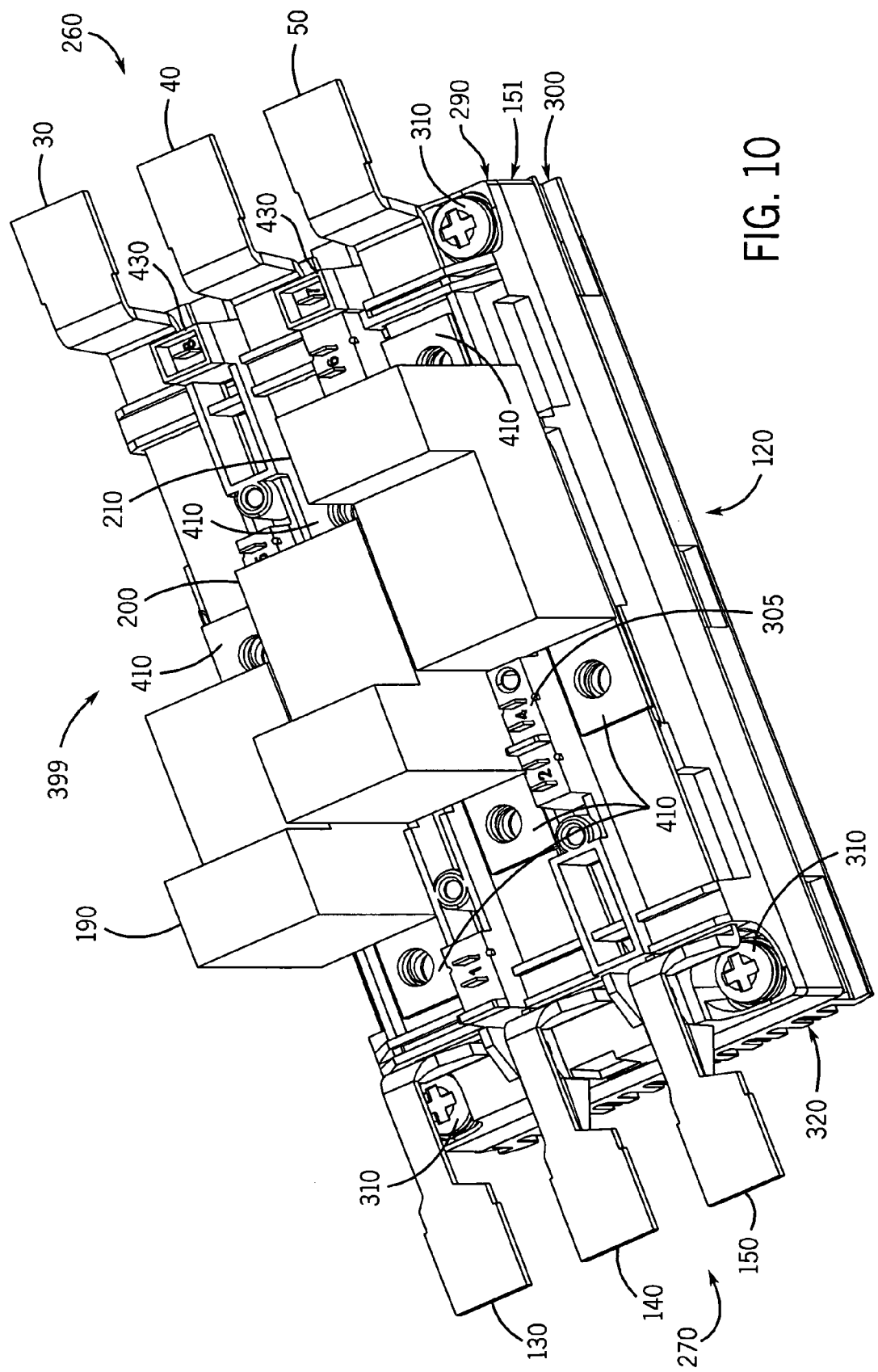

Referring to FIG. 8, the plastic housing 290 further includes six anti-torque-capture bridges 415 under which each of the bus bars 30–130 and 50–150 passes as it approaches the tabs 390,395. The bridges 415 help to capture and hold the bus bars 30–130,50–150 in place relative to the remainder of the power structure 120. FIG. 10 further shows the positioning of the bypass relays 190–210 over the bus bars 30–130 and 50–150. The bypass relays 190,210 each have a respective pair of contact terminals 410 that further are coupled to the bus bars 30,130 and 50–150 and to the tabs 390,395 by way of the screws and captured nuts 402, thereby coupling the bypass relays to the bus bars in parallel with the AC switching circuits 160–180. In the present embodiment, particularly as shown in FIGS. 4, 7 and 10, DIN tab connections 305 are provided protruding from the plastic housing 290, to which control lines (not shown) to the one or more control device(s) (not shown) for controlling the AC switching circuits 160–180 and bypass relays 190–210 can be rapidly and easily connected. Like the tabs 390,395, the DIN tab connections 305 are connected to the DCB substrates 330–350, which in turn are coupled to the corresponding terminals of the thyristors 220,230 of the appropriate AC switching circuits 160–180.

Further as shown in FIG. 7, the plastic housing 290 includes two board support brackets with grooves/notches for supporting the CT circuit board 280 to provide mechanical support for the circuit board, which also is supported by the bus bars 130–150 that pass through it and create a primary side of a CT current/electrical feedback circuit. The CT circuit board 280 provides current/electrical feedback to the control device(s) by way of one or more control lines (not shown), which can be coupled to pin connections 435 (see FIGS. 3 and 4) on the CT circuit board. Also, the CT circuit board 280 further provides coil control connection(s) for the bypass relays 190, 200 and 210.

Referring additionally to FIGS. 2 and 6, the present embodiment of the reduced voltage starter with bypass 10 includes a negative temperature coefficient (NTC) resistor 420 (also shown in FIG. 2) that senses the temperature of the thermal mass 151, and that provides signals back to the control device(s) indicative of the temperature of the AC switching circuits 160–180. FIG. 6 shows that, in the present embodiment, the NTC resistor 420 is also attached to the thermal mass 151 by way of the fourth DCB substrate 425, and thus is electrically isolated from the AC switching circuits 160–180, the thermal mass, and ground. The NTC resistor 420 is electrically coupled to NTC DIN tabs 430 (see FIGS. 7–10) that extend to the surface of the plastic housing 290, which can be easily coupled to the control device(s) (e.g., by way of wires) allowing for the sensed heat information to be utilized by the control device(s) in its control of the reduced voltage starter with bypass 10 and its switching circuits 160–180 and bypass relays 190–210.

The NTC resistor 420 and the CT board 280 of the present embodiment of the reduced voltage starter with bypass 10 is intended to provide feedback information to the one or more control device(s) operating the starter, to allow for closed loop control. The CT board 280 provides electrical feedback information by way of the pin connections 435 (see FIGS. 3 and 4), while the NTC resistor 420 provides feedback by way of the DIN tab connections 430. The present embodiment is an improvement over conventional reduced voltage starters with bypass in this regard, since conventional reduced voltage starters with bypass 10 rely primarily upon electrical feedback to derive temperature feedback and not upon real-time thermal feedback information as provided by the NTC resistor 420. Given the additional thermal feedback information, it is possible in particular to more accurately determine a starting point for the thermal mass temperature at the beginning of transitional periods, which can otherwise be difficult to obtain and therefore has been traditionally conservative.

The circuit structure shown in FIGS. 5 and 6 can be constructed as follows. First, the first, second and third AC switching circuits 160–180 (and, depending upon the embodiment, the NTC resistor 420) are formed and affixed upon the DCB substrates 330–350 (and 425) by way of the soldering process. Then, the DCB substrates 330–350 (and 425) are affixed to the thermal mass 151 by way of soldering. These steps are typically (though not necessarily) performed in this order because the soldering process between the AC switching circuits 160–180 and DCB substrates 330–350 is at a higher temperature than the soldering process between the DCB substrates and the thermal mass. Next, the plastic housing is affixed to the thermal mass 151 over the AC switching circuits 160–180 and DCB substrates 330–350 (and NTC resistor 420 and DCB substrate 425). Next, the tabs 390,395 are folded over with the captured nuts 402 provided underneath the tabs. Then, CT board 280 is positioned, followed by insertion of the bus bars 30–50 and 130–150 through bridges 405 and onto tabs 390,395. Then, the bypass relays 190–210 with contact terminals 410 are positioned. Next, screws are inserted through holes in the bus bars, tabs 390 and 395 and contact terminals 410, and attached to the captured nuts 402, thus coupling the bypass relays 190–210 in parallel with the AC switching circuits 160–180 between the bus bars 30–50 and 130–150. Finally, the control device(s) are coupled to the various input/output terminals (e.g., to the pins 435, the DIN fastons 305, and faston connections 430, fastened to the overall housing 20 above the bypass relays, and then the housing 20 is positioned about the entire power module 120.

The embodiments shown in FIGS. 1–10 are only intended to be exemplary, and the present invention is intended to encompass a variety of embodiments other than those shown in the figures and discussed above. For example, the present invention also encompasses reduced voltage starters with bypass that only receive 2 phases, or more than 3 phases, of AC power and convert those phases into output power. Also, the present invention is intended to encompass starters that employ different layouts of the AC switching circuits as well as other switching devices than those shown. Further, other configurations of the thermal mass and other devices such as the heat sink and the specific orientations of the bypass relays and bus bars (or other terminals/ports/supply lines/load lines) are intended to be encompassed by the present invention. The types of ceramic materials and substrate portions that are used also can vary from embodiment to embodiment, although in every embodiment of the invention, the AC switching circuits of the different phases are electrically isolated from one another and yet supported by a single support component in which is located the thermal mass(es) for receiving the thermal energy of the individual AC switching circuits.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A power conversion system comprising:
   first and second bus bars capable of being coupled respectively to first and second power lines;
   third and fourth bus bars capable of being coupled respectively to first and second load terminals;
   first and second switching devices coupled between the first and third bus bars and between the second and fourth bus bars, respectively;
   third and fourth switching devices coupled between the first and third bus bars and between the second and fourth bus bars, respectively, wherein when the third switching device is closed the first and third bus bars are shunted to one another, and when the fourth switching device is closed the second and fourth bus bars are shunted to one another;
   at least one intermediate portion to which the first and second switching devices are respectively attached; and
   a first mass to which the at least one intermediate portion is attached, wherein at least a majority of the heat generated by the first and second switching devices is transferred to the first mass by way of the at least one intermediate portion, and wherein the first mass has a heat capacity that is sufficient to at least temporarily store substantially all of the heat energy transferred to it from both of the first and second switching devices.

2. The power conversion system of claim 1, wherein the at least one intermediate portion includes first and second substrate portions by which the first and second switching devices are attached to the first mass, and which electrically isolate the first and second switching devices from one another.

3. The power conversion system of claim 2, wherein each of the first and second substrate portions includes a ceramic layer sandwiched between first and second copper surfaces, and wherein the ceramic layer is electrically insulating and thermally conductive.

4. The power conversion system of claim 3, wherein each of the first and second substrate portions is formed by a respective direct copper bond substrate.

5. The power conversion system of claim 3, wherein the first and second switching devices are attached to the respective first and second substrate portions by being soldered to the first copper surfaces of the respective substrate portions, and wherein the first and second substrate portions are further attached to the first mass by having the second copper surfaces of the respective substrate portions soldered to the first mass.

6. The power conversion system of claim 5, wherein the soldering of the first and second copper surfaces of the first and second substrate portions to the first and second switching devise and the first mass is achieved using lead-free solder applied by way of a vacuum soldering process.

7. The power conversion system of claim 1, wherein the first mass is a thermal mass that provides structural support for the first and second substrate portions and the first and second switching device in addition to temporarily storing heat received from the first and second switching devices.

8. The power conversion system of claim 7, wherein the thermal mass is made of at least one of copper, steel and aluminum, and wherein each bus bar is a metal conductor that forms a common junction between at least two electrical circuit components.

9. The power conversion system of claim 1, wherein a plastic housing is further attached to the first mass, wherein the first and second switching devices and the at least one intermediate portion are substantially contained within a combined assembly formed by the plastic housing and the first mass.

10. The power conversion system of claim 9, wherein at least two contact pads extend upward from each of the first and second switching devices through an outer surface of the housing.

11. The power conversion system of claim 10, wherein the first and third bus bars are respectively coupled to respective ones of the at least two contact pads of the first switching device, and wherein the second and fourth bus bars are respectively coupled to respective ones of the at least two contact pads of the second switching device.

12. The power conversion system of claim 11, wherein first and second contact leads of the third switching circuit are each respectively coupled to respective ones of the at least two contact pads of the first switching device, and wherein first and second contact leads of the fourth switching circuit also are each respectively coupled to respective one of the at least two contact pads of the second switching device.

13. The power conversion system of claim 12, wherein the first contact pad of the first switching device is coupled to the first contact lead of the third switching circuit and to the first bus bar by way of a screw and a nut, wherein the nut is captured in a pocket within the outer surface of the plastic housing between the outer surface and the first contact pad.

14. The power conversion system of claim 12, wherein the first and second bus bars are positioned next to one another at a first end of the power conversion system, wherein the third and fourth bus bars are positioned next to one another at a second end of the power conversion system, wherein the power conversion system has a first axis extending between the first and second ends, and wherein the first and second switching devices are positioned next to one another along the first axis such that the first and second switching devices are distributed perpendicular to a distribution of phases corresponding to the positioning of the bus bars.

15. The power conversion system of claim 9, wherein an outer surface of the plastic housing includes a plurality of ribs protruding outward away from the plastic housing, wherein the ribs separate a plurality of channels, and wherein the first, second, third and fourth bus bars are laid within the plurality of channels and electrically isolated from one another by way of the ribs.

16. The power conversion system of claim 15, wherein the outer surface of the plastic housing further includes first, second, third and fourth bridges defining passages through which the first, second, third and fourth bus bars extend, and wherein the bridges retain the bus bars in place relative to the plastic housing.

17. The power conversion system of claim 15, wherein the outer surface of the plastic housing further includes at least one vent positioned generally above the first and second switching circuits allowing for at least a portion of expanding gases created under a short-circuit event to escape.

18. The power conversion system of claim 9, wherein an outer surface of the plastic housing further includes at least one bracket having a notch for supporting a circuit board, and further includes at least one DIN tab connection terminal.

19. The power conversion system of claim 18, wherein the supporting of the circuit board provided by the plastic housing allows for the third and fourth bus bars to pass through the circuit board so that a primary side of a current transformer feedback circuit is created.

20. The power conversion system of claim 1, further comprising a current transformer (CT) circuit board coupled to the third and fourth bus bars, wherein the CT circuit board provides at least one output signal indicative of at least one characteristic of electrical power being delivered at the third and fourth bus bars.

21. The power conversion system of claim 1, further comprising a temperature feedback device attached to an additional intermediate portion that in turn is attached to the first mass, wherein the temperature feedback device outputs a signal indicative of a temperature of the first mass.

22. The power conversion system of claim 21, wherein the temperature feedback device is a negative temperature coefficient (NTC) resistor, wherein the additional intermediate portion is a DCB substrate, wherein the signal output by the NTC resistor provides thermal feedback information and an additional signal output by a current transformer (CT) board coupled to the third and fourth bus bars provides electrical feedback information, wherein both of the thermal feedback information and electrical feedback information are provided to a control device that controls the first, second, third and fourth switching devices at least in part based upon that information.

23. The power conversion system of claim 1, further comprising a heat sink coupled to a first side of the first mass, wherein the first and second substrate portions are coupled to a second side of the first mass.

24. The power conversion system of claim 23, wherein the heat sink includes a plurality of fins, and wherein the heat sink is configured to receive a flow of air along the fins to facilitate dissipation of heat from the fins.

25. The power conversion system of claim 23, wherein the first mass receives heat from the first and second switching devices during a transitional mode of operation of the power conversion system, and wherein heat from the first mass is dissipated by way of the heat sink during a steady-state mode of operation of the power conversion system.

26. The power conversion system of claim 25, wherein heat generated by the third and fourth switching devices is primarily dissipated by way of the first, second, third and fourth bus bars.

27. The power conversion system of claim 1, further comprising:
an outer housing including the switching devices, the substrate portions, the first mass, a heat sink coupled to the first mass, a plastic housing coupled to the first mass, at least one feedback device, and at least a portion of each of the bus bars.

28. The power conversion system of claim 27, further comprising a controller for controlling operation of the switching devices based at least in part upon feedback information provided by the at least one feedback device, wherein the controller is one of contained within the outer housing and positioned external to the outer housing, wherein the controller is electrically coupled to at least one of the switching devices and to the at least one feedback device, and wherein the controller includes at least one of a microprocessor, a programmable logic device (PLD), a computer, a microcontroller, an integrated circuit, and a plurality of discrete electronic control devices.

29. The power conversion system of claim 1, wherein each of the first and second switching devices includes a pair of back to back switching components, wherein each of the switching components is selected from the group consisting of a power thyristor, a Gate Turn-Off device, and a semiconductor switching device, and wherein each of the third and fourth switching devices is a low-voltage bypass relay that has a low contact resistance in comparison to the switching component and is capable of carrying but not making or breaking line current.

30. The power conversion system of claim 1, further comprising:
fifth and sixth bus bars capable of being coupled, respectively, to a third power line and a third load terminal; and fifth and sixth switching devices coupled between the fifth and sixth bus bars, wherein when the fifth switching device is closed the fifth and sixth bus bars are short-circuited to one another.

31. A reduced voltage starter with bypass comprising:
first, second and third switching devices coupled between first, second, and third pairs of ports, respectively;
first, second, and third bypass means for shunting the first, second and third pairs of ports to one another during a steady-state mode of operation;
a thermal energy receiving device that receives thermal energy generated by at least two of the first, second and third switching devices during a transitional mode of operation; and
means for electrically isolating the first, second and third switching devices from one another, wherein the means for electrically isolating is coupled at least indirectly to each of the first, second and third switching devices and to the thermal energy receiving device.

32. The reduced voltage starter with bypass of claim 31, wherein additional thermal energy generated by the first, second and third bypass means during the steady-state mode of operation is dissipated primarily by way of the first, second and third pairs of ports.

33. The reduced voltage starter with bypass of claim 31, further comprising a housing coupled to the thermal energy receiving device, wherein the first, second and third switching devices are substantially contained within a combined assembly formed by the housing and the thermal energy receiving device, wherein the first, second and third bypass means are supported along an outer surface of the housing, wherein the first, second and third bypass means are respectively coupled to the first, second and third switching devices respectively by way of a plurality of connectors that protrude through the housing, and wherein the first, second and third bypass means are electrically isolated from one another at least in part by way of protrusions formed along the outer surface of the housing.

34. The reduced voltage starter with bypass of claim 33, further comprising:
a circuit board coupled to one of each of the first, second, and third pairs of ports for providing electrical feedback information, wherein the circuit board is supported at least indirectly by the housing; and
an NTC resistor in thermal association with the thermal energy receiving device for providing thermal feedback information,
wherein a control device controls the operation of the first, second and third switching devices and the first, second and third bypass means at least in part based upon each of the electrical feedback information and the thermal feedback information.

35. The reduced voltage starter with bypass of claim 31, further comprising:
a heat sink coupled to the thermal energy receiving device for dissipating energy from the thermal energy receiving device during the steady-state mode of operation,
wherein the switching devices, bypass means, thermal energy receiving device and heat sink are integrated in a compact manner.

36. A method of power conversion comprising:
receiving AC power at first and second input ports, wherein the AC power received at the first input port is associated with a first phase and the AC power received at the second input port is associated with a second phase;
converting the received power so that at least one characteristic of the received power is modified, wherein the converting is performed by first and second primary switching devices coupled to the first and second input ports;
conducting thermal energy away from the first and second primary switching devices to a shared thermal mass, wherein the first and second primary switching devices are electrically isolated from one another;
outputting the converted, received power at first and second output ports respectively coupled to the first and second primary switching devices; and
closing first and second secondary switching devices coupled in parallel respectively with the first and second primary switching devices so that the first input and output ports are shunted to one another and the second input and output ports are shunted to one another.

37. The method of claim 36, further comprising:
conducting heat away from the first and second secondary switching devices when the first and second secondary switching devices are closed primarily by way of at least one of the input ports and the output ports.

38. The method of claim 36, wherein the shared thermal mass has sufficient heat capacity to receive and retain substantially all of the thermal energy generated by the first and second primary switching devices during a transitional mode when the first and second secondary switching devices are open, and further comprising:
conducting heat away from the thermal mass by way of a heat sink during a steady-state mode when the first and second secondary switching devices are closed,
whereby the thermal mass is reset during the steady-state mode to receive additional thermal energy from the first and second primary switching devices when the first and second secondary switching devices are reopened.

39. The method of claim 36, wherein the first and second primary switching devices each include one of a pair of power thyristors, a pair of Gate Turn-Off devices, and a pair of semiconductor switching devices, and wherein each of the first and second secondary switching devices includes a bypass relay.

40. The method of claim 36, further comprising:
receiving at least one signal concerning at least one characteristic of the power received at the first and second output ports; and
controlling at least one of the primary and secondary switching devices based at least in part upon the at least one signal.

41. The method of claim 36, further comprising:
receiving at least one signal relating to a temperature of the thermal mass; and
controlling at least one of the primary and secondary switching devices based at least in part upon the at least one signal.

42. The method of claim 41, further comprising:
receiving at least one signal concerning at least one characteristic of the power received at the first and second output ports; and
controlling at least one of the primary and secondary switching devices based at least in part upon the at least one signal concerning the at least one power characteristic.

43. The method of claim 36, wherein the conduction of the thermal energy away from the first and second primary switching devices occurs by way of first and second substrate portions coupled respectively to the first and second primary switching devices and to the shared thermal mass, and wherein the first and second substrate portions electrically isolate the first and second primary switching devices from the shared thermal mass and from one another.

44. The method of claim 36, wherein the first and second primary switching devices are substantially contained within a combined assembly formed by the shared thermal mass and a plastic housing coupled to the shared thermal mass, and wherein the shared thermal mass at least indirectly supports each of the first and second primary switching devices.

45. The method of claim 44, wherein the plastic housing includes a vent positioned proximate at least one of the first and second primary switching devices, wherein at least a portion of expanding gases created under a short-circuit event can escape by way of the vent; and
wherein the plastic housing further includes a plurality of channels along an outer surface of the plastic housing, wherein electrical isolation is provided between at least two adjacent conductors supported along the outer surface of the plastic housing.

46. A method of constructing a reduced voltage starter with bypass comprising:
affixing first, second and third primary switching devices to first, second, and third intermediate components;
affixing the first, second, and third intermediate components upon a thermal mass; and
coupling first, second and third secondary switching devices in parallel respectively with the first, second and third primary switching devices between first, second and third pairs of ports, respectively,
wherein the intermediate components are thermally conductive so that thermal energy is capable of flowing from the first, second and third primary switching devices to the thermal mass, and wherein the intermediate components are electrically insulating to electrically isolate the first, second and third primary switching devices from the thermal mass and from one another.

47. The method of claim 46, further comprising:
affixing a plastic housing to the thermal mass so that the first, second, and third primary switching devices and first, second and third intermediate components are substantially contained within a combined assembly formed by the plastic housing and the thermal mass.

48. The method of claim 47, further comprising:
providing a plurality of cavities within an outer surface of the plastic housing;
providing a plurality of fastening devices within the cavities;
folding over a plurality of contact pads of the first, second, and third primary switching devices over the cavities, wherein the contact pads protrude through the plastic housing to the outer surface of the plastic housing; and
providing a plurality additional conductors along the outer surface of the plastic housing, wherein each of the additional metallic conductors is associated with at least one of the first, second, and third secondary switching devices and at least one of the ports;
wherein the plurality of fasteners are trapped within the cavities due to the positioning of at least one of the contacts and the additional conductors.

49. The method of claim 48, wherein each of the fasteners is a nut, wherein each of the additional conductors is a bus bar that forms one of the ports of each of the first, second and third pairs of ports, and wherein the coupling of the primary and secondary switching devices is achieved by coupling a plurality of screws to the plurality of nuts, wherein each screw passes through a respective bus bar, a respective contact lead from one of the secondary switching devices, and a respective contact pad of one of the primary switching devices, and wherein upon the coupling of each screw to a respective nut, the respective bus bar, contact lead and contact pad through which the respective screw passes are electrically coupled to one another.

50. The method of claim 47, further comprising:
inserting a plurality of bus bars through a plurality of orifices formed by a plurality of bridge formations along an outer surface of the plastic housing, wherein each of the bus bars forms one of the ports of the first, second and third pairs of ports.

51. The method of claim 50, further comprising:
inserting a circuit board into a channel formed on the outer surface of the plastic housing by at least one bracket, wherein the circuit board further includes a plurality of orifices through which at least three of the bus bars pass.

52. The method of claim 47, further comprising:
inserting a plurality of bus bars into a plurality of channels formed by a plurality of ribs along the outer surface of the plastic housing, wherein each of the bus bars forms one of the ports of the first, second and third pairs of ports, and wherein each of the bus bars is electrically isolated from the other bus bars at least in part due to the ribs.

53. The method of claim 46, further comprising affixing a NTC resistor to a fourth intermediate component, and affixing the fourth intermediate component upon the thermal mass, wherein the NTC resistor is thermally coupled to the thermal mass.

54. The method of claim 46, coupling at least one electrical conductor to at least one DIN tab connector associated with at least one of the switching devices and another electrical component, in order to allow for signals to proceed to and from a control device.

55. The method of claim 46, wherein the first, second and third intermediate components are direct copper bond (DCB) substrates attached to the shared thermal mass and the first, second and third switching devices by way of lead-free solder applied by way of a vacuum soldering technique.

56. An integrated power structure for performing power conversion, the structure comprising:
a housing;
a thermal mass to which the housing is affixed;
a plurality of input bus bars and a plurality of output bus bars, wherein all of the bus bars are supported by the housing;
a plurality of primary switching circuits governing power conversion, wherein all of the switching circuits are substantially contained within a cavity formed between the housing and the thermal mass; and
a plurality of secondary switching circuits capable of shunting the input bus bars with corresponding ones of the output bus bars, wherein each of the secondary switching circuits is supported by at least one of the primary switching circuits, the bus bars and the housing.

57. The integrated power structure of claim 56, further comprising:
a heat sink coupled to the thermal mass.

58. The integrated power structure of claim 57, wherein the plurality of primary switching circuits include a plurality of DCB substrates by which the primary switching circuits are thermally coupled to the thermal mass, wherein the DCB substrates include electrically insulating portions so that the primary switching circuits are electrically isolated from one another and from the thermal mass.

59. The integrated power structure of claim 56,
wherein each of the input bus bars corresponds to and is substantially aligned with a respective one of the output bus bars;
wherein each pair of aligned input and output bus bars is substantially parallel to the other pairs of aligned input and output bus bars;
wherein each of the secondary switching circuits is coupled between and aligned with the input and output bus bars of a respective one of the pairs of bus bars; and
wherein first and second contact pads associated with each of the primary switching circuits are respectively coupled to the input and output bus bars of a respective one of the pairs of bus bars.

60. The integrated power structure of claim 56,
wherein the plurality of input bus bars are supported proximate a first end of the housing, and the plurality of output bus bars are supported proximate a second end of the housing, wherein a first axis extends between the first and second ends of the housing, and wherein the primary switching circuits are respectively distributed at successive locations along the first axis between the first and second ends.

61. An apparatus for use in a reduced voltage starter, the apparatus comprising:
a housing for substantially containing a plurality of switching circuits within an interior of the housing;
a plurality of orifices within the housing by which a plurality of contacts can extend from the plurality of switching circuits to an exterior of the housing;
a plurality of channels formed along the exterior of the housing; and
a plurality of conductors positioned within the plurality of channels along the exterior of the housing, wherein each of the conductors is coupled to a respective one the contacts, and each of the conductors is electrically isolated from the other conductors.

62. The apparatus of claim 61, wherein the plurality of channels are separated, at least in part, by a plurality of ribs formed along the exterior of the housing, wherein the conductors are electrically isolated from one another at least in part by way of the ribs.

63. The apparatus of claim 61, wherein the plurality of channels are formed, at least in part, by a plurality of bridges formed along the housing.

64. The apparatus of claim 61, wherein the housing is formed by a combination of a plastic housing and a plate, wherein the plastic housing is affixed to the plate.

65. The apparatus of claim 61, further comprising at least one vent formed in the housing, wherein at least a portion of expanding gases created under a short-circuit event are allowed to escape by way of the at least one vent.

66. The apparatus of claim 61, wherein the housing is formed at least in part from plastic and includes at least one DIN tab connector and at least one bracket with a notch for supporting a circuit board.

* * * * *